United States Patent
Oh (10) Patent No.: US 8,661,611 B2
(45) Date of Patent: Mar. 4, 2014

(54) DUST COLLECTOR FOR A VACUUM CLEANER HAVING A FILTERED DUST REMOVAL FUNCTION AND VACUUM CLEANER

(75) Inventor: Jang Keun Oh, Gwangju (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 272 days.

(21) Appl. No.: 13/386,296

(22) PCT Filed: Apr. 7, 2010

(86) PCT No.: PCT/KR2010/002115
§ 371 (c)(1),
(2), (4) Date: Jan. 20, 2012

(87) PCT Pub. No.: WO2011/010787
PCT Pub. Date: Jan. 27, 2011

(65) Prior Publication Data
US 2012/0151712 A1 Jun. 21, 2012

(30) Foreign Application Priority Data
Jul. 24, 2009 (KR) .................. 10-2009-0067670

(51) Int. Cl.
*A47L 9/10* (2006.01)
(52) U.S. Cl.
USPC ............... 15/352; 15/353; 55/304; 55/405; 55/429; 55/DIG. 3
(58) Field of Classification Search
USPC ........... 15/352, 353; 55/304, 405, 429, 459.1, 55/295–298, 337, DIG. 3
See application file for complete search history.

(56) References Cited

U.S. PATENT DOCUMENTS

| | | | |
|---|---|---|---|
| 6,916,351 B2 | 7/2005 | Oh | |
| 6,928,692 B2 | 8/2005 | Oh et al. | |
| 7,152,277 B2 | 12/2006 | Jung et al. | |
| 7,628,830 B2 * | 12/2009 | Ohtsu et al. ..................... | 55/300 |
| 7,736,406 B2 * | 6/2010 | Kuroki et al. .................. | 55/300 |
| 2003/0208879 A1 | 11/2003 | Oh et al. | |
| 2003/0221278 A1 | 12/2003 | Oh | |
| 2004/0163206 A1 | 8/2004 | Oh | |
| 2004/0177471 A1 | 9/2004 | Jung et al. | |

FOREIGN PATENT DOCUMENTS

| | | |
|---|---|---|
| JP | 48-10345 | 2/1973 |
| JP | 2003-88485 | 3/2003 |
| KR | 2003-0088534 | 11/2003 |
| KR | 2003-0092882 | 12/2003 |
| KR | 10-2004-0075574 | 8/2004 |
| KR | 10-2004-0081706 | 9/2004 |
| KR | 10-0729716 | 6/2007 |
| KR | 10-0804568 | 2/2008 |

OTHER PUBLICATIONS

International Search Report for PCT/KR2010/002115 mailed Nov. 26, 2010.

* cited by examiner

*Primary Examiner* — David Redding
(74) *Attorney, Agent, or Firm* — Staas & Halsey LLP

(57) ABSTRACT

A dust collector includes a centrifugal separator, a discharge unit having a filtered dust collecting space provided with a discharge unit discharge hole at a discharging side of the centrifugal separator and an intake passage communicating with a bottom of the discharge unit discharge hole, a filter unit provided with a filter member and mounted at the discharge unit discharge hole, and a sealing member including a dust removing device mounted on the filter unit and a dust container formed on a bottom surface of the centrifugal separator, wherein the sealing member opens the filtered dust collecting space and the intake passage by means of the weight thereof and closes the filtered dust collecting space and the intake passage by means of negative pressure.

14 Claims, 5 Drawing Sheets

DUST COLLECTOR FOR A VACUUM CLEANER HAVING A FILTERED DUST REMOVAL FUNCTION AND VACUUM CLEANER

CROSS-REFERENCE TO RELATED APPLICATIONS

This application is a U.S. national phase of International Application No. PCT/KR2010/002115 filed on Apr. 7, 2010, which claims priority to Korean Application No. 10-2009-0067670, filed on Jul. 24, 2009, the contents of which are hereby incorporated by reference.

BACKGROUND

1. Field

The present disclosure relates to a dust collector for a vacuum cleaner having a filtered dust removal function and a vacuum cleaner.

2. Description of the Related Art

In order to save the trouble of replacing a dust bag and a burden of expenses, a centrifugal type vacuum cleaner having a dust collector, which includes a centrifugal separator separating dust that flows in by means of negative pressure, a dust container accommodating the dust separated from the centrifugal separator, and a filter (referred to as a second filter) filtering fine substances included in air from which the dust has been separated, has been widely spread.

In the case of the dust collector in the related art having the above-described configuration, if fine dust is accumulated in the second filter, an intake force may fall down, and thus the suction of the foreign substances on a cleaning surface and dust separation in the centrifugal separator may not be performed smoothly.

Accordingly, various related art devices for removing dust accumulated in the second filter have been disclosed. Examples of such related art devices may be vacuum cleaners disclosed in Korean Registered Patent No. 0729716 (related art 1), Japanese Registered Patent No. 48-10345 (related art 2), and Korean Registered Patent No. 0804568 (related art 3), respectively.

The related art 1 is provided with a dust removing unit that is driven by a control unit of a vacuum cleaner in which a second filter is installed in the downstream of a centrifugal separation unit. The dust removing unit removes the dust accumulated in the second filter by periodically flicking the dust of the second filter through the control unit. Accordingly, the related art 1 discloses a configuration that can prevent deterioration in function of the vacuum cleaner due to the flow degradation of the second filter.

However, in the case of the related art 1, it is required to separately remove the dust that has been separated from the second filter, and this causes inconvenience in use.

The related art 2 discloses a structure that flicks dust accumulated in a second filter through a dust removing unit. The dust separated from the second filter is collected in a separate passage that is connected between a connection hole formed on a dust container and a flow hole that intakes external air. Accordingly, if the vacuum cleaner is operated, the dust that is separated from the second filter by the external air that flows in through the flow hole is collected inside the dust container through the connection hole.

However, in the case of the related art 2, since a separate passage for making the dust separated from the second filter flow into the dust container is constructed, the structure of the dust container becomes complicated, and a pressure loss occurs. Further, since the size of the separate passage for connecting the connection hole and the flow hole is limited to lower the pressure loss of the vacuum cleaner, the dust separated from the second filter is unable to be easily removed.

In the case of the related art 3, dust that is separated from a second filter is stored in a separate storage space. In this case, the separate storage space has a small volume, and thus it is required to frequently leave the collected dust to cause inconvenience in use.

SUMMARY

The present disclosure has been made to address at least the above problems and/or disadvantages and to provide at least the advantages described below. Accordingly, an aspect of the present disclosure provides a dust collector for a vacuum cleaner having a filtered dust removal function and a vacuum cleaner, which can simultaneously remove dust separated from a centrifugal separator and dust separated from a filter through collection of the dust removed from the filter in a dust container.

Another aspect of the present disclosure provides a dust collector for a vacuum cleaner having a filtered dust removal function and a vacuum cleaner, which can provide convenience in use through automatic removal of dust, which is separated from a filter, from a filtered dust collecting space.

Still another aspect of the present disclosure provides a dust collector for a vacuum cleaner having a filtered dust removal function and a vacuum cleaner, which can prevent a filter member from being re-contaminated by dust that is separated from the filter member.

According to one aspect of the present disclosure, a dust collector for a vacuum cleaner includes a centrifugal separator; a discharge unit that is a filtered dust collecting space having a discharge unit discharge hole on a discharge side of the centrifugal separator, the lower portion of the discharge unit discharge hole communicating with an intake passage; a filter unit having a filter member and mounted on the discharge unit discharge hole; a dust removing device mounted on the filter unit; a dust container, formed on a bottom surface of the centrifugal separator; and a sealing member opening the filtered dust collecting space and the intake passage by means of a weight thereof and closing the filtered dust collecting space and the intake passage by means of a negative pressure.

According to anther aspect of the present disclosure, a dust collector for a vacuum cleaner includes a centrifugal separator separating dust from external air that flows in through an intake passage; a dust container into which dirt or the dust separated by the centrifugal separator moves; a filter unit installed in a rear portion of the centrifugal separator to filter fine dust of the air discharged from the centrifugal separator; a dust removing device flicking the dust put on the filter unit; and a filtered dust collecting space in which the dust that is separated by the dust removing device is stored, wherein the dust that is separated from the filter unit by the dust removing device moves to and is temporarily stored in the filtered dust collecting space when the vacuum cleaner is operated, moves onto the intake passage when the cleaner is stopped, and moves to and is centrifugally separated by the centrifugal separator when the cleaner is re-operated to be finally stored in the dust container.

The movement of the separated dust onto the filtered dust collecting space and the intake passage may be performed by the weight of the separated dust.

The dust collector according to the aspect of the present disclosure may further a sealing member opening/closing a passage between the filtered dust collecting space and the intake passage by means of an intake force.

According to still another aspect of the present disclosure, a vacuum cleaner includes a main body; an intake nozzle body; a hose connecting the intake nozzle body to the main body; and a dust collector having a dust removing device removing dust that is accumulated in a filter member coupled to a discharge unit discharge hole, wherein the dust collector includes a centrifugal separator receiving an inflow of external air through an intake passage; a discharge unit that is a filtered dust collecting space having the discharge unit discharge hole provided on a discharge side of the centrifugal separator, the lower portion of the discharge unit discharge hole communicating with an intake passage on a bottom surface thereof; a filter unit having a filter member and mounted on the discharge unit discharge hole; a dust removing device mounted on the filter unit; and a dust container formed on a bottom surface of the centrifugal separator, and a sealing member opening the filtered dust collecting space and the intake passage by means of a weight thereof and closing the filtered dust collecting space and the intake passage by means of a negative pressure.

In the dust collector and the vacuum cleaner as constructed above, the dust container may be formed to be detachable from the centrifugal separator.

Alternatively, the dust container may include a dust container cover having a dust container cover inlet port formed thereon and coupled to a lower portion of the dust container to be opened or closed; a horizontal intake passage provided in the lower portion of the dust container to communicate with the dust container cover inlet port; and a vertical intake passage making the horizontal intake passage and a centrifugal separating tube of the centrifugal separator communicate with each other, wherein a lower portion of the filtered dust collecting space communicates with the vertical intake passage and the horizontal intake passage in an engagement position of the vertical intake passage and the horizontal intake passage.

Further, the filtered dust, which is separated from the filter member through driving of the dust removing device and is collected in the filtered dust collecting space, is discharged to the horizontal intake passage if the sealing member is opened. Thereafter, if the vacuum cleaner is driven, the filtered dust that is discharged to the horizontal intake passage flows into the centrifugal separating tube to be separated, and then is discharged to the dust container.

The dust removing unit may be installed on an upper surface of the filter member that is installed in the filter unit, and the driving unit may be configured to be coupled to the dust removing unit on the outside of the filter unit.

The dust removing unit may include one or more dust removing members; a first fixing member connecting and fixing end portions of the dust removing members that are positioned to be far apart from the driving unit; and a connection member connecting and fixing end portions of the dust removing members that are exposed to the outside of the filter unit.

A plurality of dust removing protrusions formed to protrude at predetermined intervals may be formed on a bottom surface of the dust removing member. In this case, the dust removing protrusions may be formed to protrude from the entire area of a bottom surface of the dust removing member. The dust removing protrusions are all in contact with an upper surface of the filter member.

The filter unit may include a guide member that guides a reciprocating movement of one or more of the first fixing member and the second fixing member.

The driving unit may include a motor; a cam coupled to a motor shaft of the motor; a first cam shaft rotatably coupled to the cam so that one, end portion thereof becomes eccentric; a cam link having one end portion that is rotatably coupled to the other end portion of the first cam shaft; and a second cam shaft rotatably coupled to the connection member which connects and fixes end portions of the dust removing members that are exposed to the outside of the filter unit.

The centrifugal separator may be installed to divide the interior of the dust container into a dust collecting space, a filtered dust collecting space, and the discharge unit.

The centrifugal separator may be cylindrical and may be installed in a horizontal direction, and the intake passage may be installed on a lower portion of the centrifugal separator in a horizontal direction.

The discharge unit may be formed to be inclined at a predetermined angle against a vertical line that passes the center of the centrifugal separator so that the discharge unit discharge hole is positioned on the upper portion of the filtered dust collecting space.

According to the present disclosure, the dust that is removed from the filter member by the dust removing device and then is collected is discharged to the dust container by making the dust flow into the centrifugal separator through the intake, the filter member is prevented from being re-contaminated by the dust that is removed from the filter member.

Further, according to the present disclosure, since the dust that is separated from the filter member is automatically collected in the dust container through driving of the vacuum cleaner, even the dust that is separated from the filter member can be put away by emptying only the dust container, and thus the inconvenience in use can be removed when the dust that is separated from the filter member is removed.

Further, according to the present disclosure, by engaging the dust removing device, in which the dust removing unit and the driving unit are arranged on the same plane, with the dust collector, the size of the dust removing device can be reduced without lowering the capacity of the dust collecting space, and the size of the dust collecting device having a dust flicking function can also be reduced.

Further, according to the present disclosure, since the dust removing unit and the driving unit are arranged on the same plane without overlapping, assembling and management of the dust removing unit or the driving unit can be easily performed, as well as the assembling and management of the dust collecting device.

Further, according to the present disclosure, by increasing the contact area between the dust removing unit and the filter member, impact is transferred to the entire filter, and thus the dust that is accumulated in the entire filter space may be uniformly removed.

BRIEF DESCRIPTION OF THE DRAWINGS

The above and other aspects, features and advantages of the present disclosure will be more apparent from the following detailed description when taken in conjunction with the accompanying drawings, in which.

DETAILED DESCRIPTION

Hereinafter, preferred embodiments of the present disclosure will be described in detail with reference to the accompanying drawings.

Figure 1:
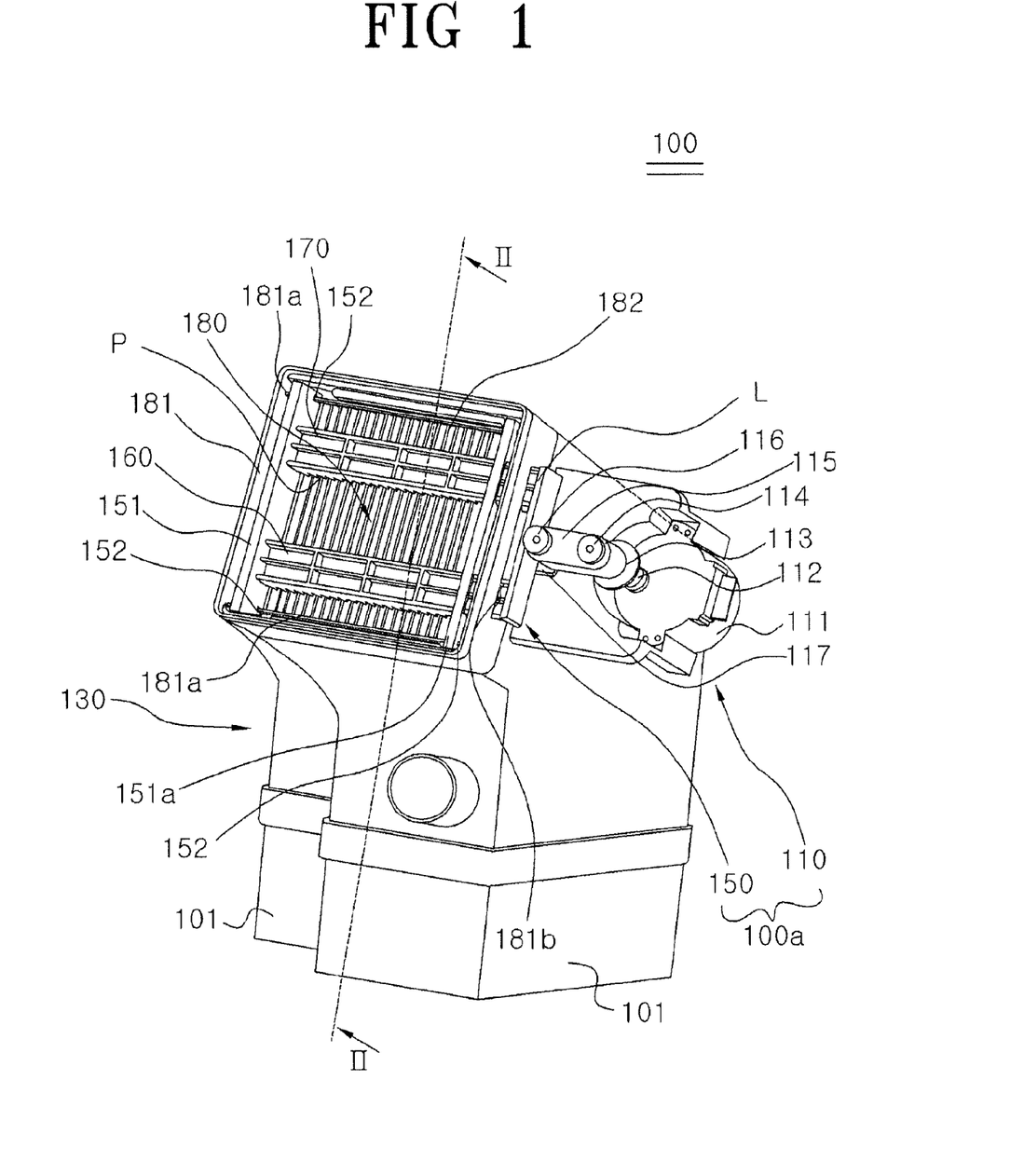
FIG. 1 is a perspective view of a dust collector 100 according to a first embodiment of the present disclosure.
Figure 2:
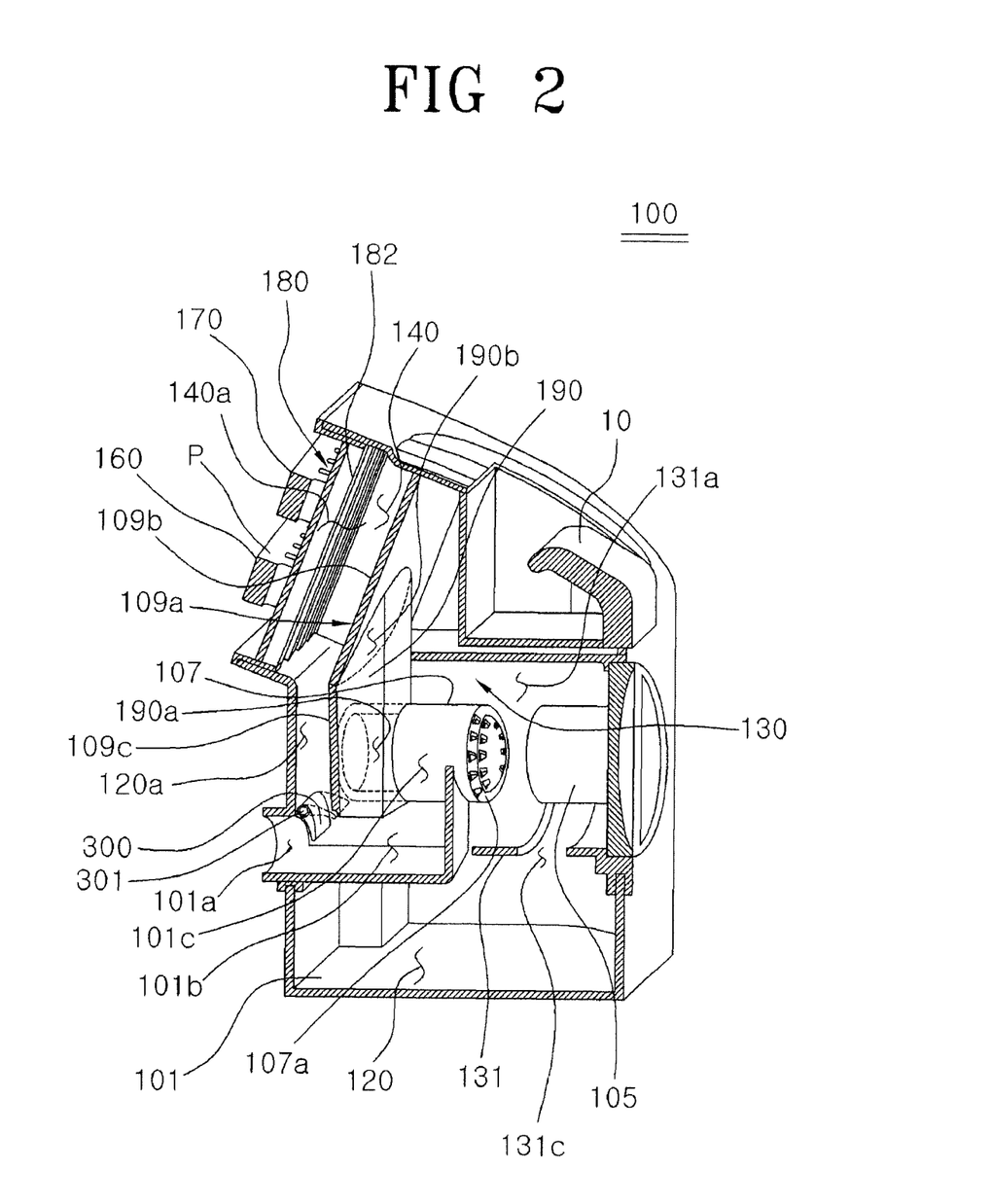
FIG. 2 is a cross-sectional view of a dust collector 100 as seen from II direction after cutting along line II-II of FIG. 1.

FIG. 1 is a perspective view of a dust collector 100 according to a first embodiment of the present disclosure, and FIG. 2 is a cross-sectional view of a dust collector 100 as seen from II direction after cutting along line II-II of FIG. 1.

Referring to FIGS. 1 and 2, the dust collector 100 includes a dust container 101, a centrifugal separator 130, a filter unit 180, and a dust removing device 100a.

First, the dust container 101 has a box type structure in which an upper portion thereof is open and an inner portion thereof becomes a dust collecting space 120.

The centrifugal separator 130 (see FIG. 2) is arranged in a horizontal direction, and includes a centrifugal separating tube 131, a stabilizer 105, a discharge tube 107, and a first separation wall 109a that partitions an upper space as a discharge unit 140 and that partitions a lower portion of the filter unit 180 as a filtered dust collecting space 120a, and a handle 10 is formed on the upper portion of the centrifugal separator 130.

The centrifugal separator 130 is cylindrical and is installed in the horizontal direction, and an intake passage 101b is installed on a lower portion of the centrifugal separator 130 in the horizontal direction.

The centrifugal separating tube 131 includes an intake passage 101b on which an inlet port 101a making external air flow into the inside is formed, a dust discharge hole 131c discharging the separated dust to the dust container 101, and a discharge passage 190 discharging the air which has been discharged through a discharge tube 107 to an upper discharge unit 140. Further, the discharge tube 107 and the stabilizer 105 are installed inside the centrifugal separating tube 131.

The intake passage 101b is installed on the lower portion of the centrifugal separator 130 in the horizontal direction to communicate with the lower portion of the filtered dust collecting space 120a. An end portion of one open side of the intake passage 101b is coupled to an outer surface of the discharge tube 107 to form intake hole 101c. The intake hole 101c is formed to make air flow in a circumference direction of the discharge tube 107 so that the inflow air is rotated around the discharge tube 107.

A grill 107a for discharge is formed on an end portion of one side of the discharge tube 107, and a side surface of the other end portion of the discharge tube 107 is open to form the discharge passage intake hole 101c that communicates with the inner portion of the discharge passage 190 and to be coupled to the discharge passage 190.

The first separation wall 109a has an upper portion provided with an inclined surface 109b that is inclined at a predetermined angle and a lower portion provided with a vertical surface 109c that is apart for a predetermined distance from a wall surface on which the centrifugal separating tube 131 and the inlet port 101a of the centrifugal separator 130 are formed, and divides the inner space of the centrifugal separator 130 and the filtered dust collecting space 120a.

By the first separating wall 109a and the centrifugal separating tube 131, the inner space of the centrifugal separator 130 is divided into a centrifugal separating tube inner space 131a, the filtered dust collecting space 120a, and the discharge unit 140.

On the inclined surface 109b of the first separating wall 109a, a discharge passage discharge hole 190b that forms an upper intake hole 101c of the discharge passage 190 is penetratingly formed to communicate with the discharge unit 140 and the inner portion of the discharge passage 190.

On a side wall of an upper portion of the filtered dust collecting space 120a that is on an outer wall of the discharge unit 140, a discharge unit discharge hole 140a is formed so that an upper portion of the discharge unit discharge hole 140a is inclined to the inner portion of the centrifugal separator 130 at a predetermined angle against the vertical direction. A filter unit 180 that includes a filter member 182 for removing fine dust included in the discharged air is coupled to the discharge unit discharge hole 140a. The filter unit 180 includes a filter gasket 181 coupled to the discharge unit discharge hole 140a and the filter member 182.

The filter gasket 181 is installed around the filter member 182, and guide members 181a that guide a reciprocating motion of the dust removing unit 150 are formed along the length direction of a first dust removing member 160 and a second dust removing member 170. On a surface that is adjacent to the driving unit 110 among surfaces of the filter gasket 181 that are perpendicular to a surface of the filter gasket 181 on which the guide member 181a is formed, a dust removing member moving hole 181b is formed, through which the first dust removing member 160 and the second dust removing member 170 are penetratingly exposed to the outside.

The dust removing device 100a includes a driving unit 110 and a dust removing unit 150.

The driving unit 110 is coupled to an upper and outer side surface of the dust container 101 to transfer a driving force for the reciprocating motion to the dust removing unit 150.

The dust removing unit 150 performs reciprocating motion on the upper portion of the filter member 182 by means of the driving unit 110 to flick the dust accumulated in the filter member 182.

The dust that is separated from the filter unit 180 by the dust removing device 100a moves to and is temporarily stored in the filtered dust collecting space 120a when the vacuum cleaner 1 (see FIG. 3) is operated, and moves onto the intake passage when the vacuum cleaner is stopped. When the vacuum cleaner is re-operated, the dust moves to the centrifugal separator 130 to be centrifugally separated, and then is finally stored in the dust container 101.

The driving unit 110, as shown in FIG. 1, includes a motor 111 having a motor shaft 112, a cam 113, a first cam shaft 114, a cam shaft link 115, and a second cam shaft 116.

The motor 111 is provided with the motor shaft 112. The cam 113 is coupled to the motor shaft 112. The first cam shaft 114 is eccentrically coupled to the cam 113. The cam shaft link 115 has one end portion that is rotatably coupled to the first cam shaft 114. The second cam shaft 116 has an upper end portion that is rotatably coupled to the other end portion of the cam shaft link 115 and a lower end portion that is rotatably coupled to a connection member L.

The dust removing unit 150, as illustrated in FIG. 1, includes a first dust removing member 160, a second dust removing member 170, a first fixing member 151, a second fixing member 151a, and the connection member L.

The first dust removing member 160 and the second dust removing member 170 have side portions coupled to the guide member 181a so as to perform left and right reciprocating motion inside the filter gasket 181, and one end portions formed as plates that are exposed to an outside of the filter gasket 181. The distance of the reciprocating motion of the first dust removing member 160 and the second dust removing member 170 is determined by a rotating diameter of the first cam shaft 114 that is coupled to the cam 113.

On the bottom surfaces of the first dust removing member 160 and the second dust removing member 170, as shown in FIGS. 1 and 2, a plurality of dust removing protrusions P are formed to project at predetermined intervals in the length direction and are in contact with the filter member 182. The dust removing protrusion P, in the case where the filter member 182 is a pleats filter, has peaks and valleys formed thereon in a direction that corresponds to peaks and valleys of the pleats filter to apply impact to the filter member 182 without damaging the filter member 182.

The first dust removing member 160 and the second dust removing member 170 become the dust removing member according to the present disclosure, and two or more members may be provided in parallel to each other.

On side portions of the first fixing member 151 and the second fixing member 151 a, a guide groove 152, into which the guide member 181a (see FIG. 1) is inserted, is formed so that left and right reciprocating motion thereof can be guided along the guide member 181a.

The first fixing member 151 is coupled to the filter gasket 181 so that the guide member 181a is inserted into the guide groove 152, and connects and fixes adjacent end portions of the first dust removing member 160 and the second removing member 170 which are positioned far apart from the driving unit 110.

Further, the second fixing member 151a is coupled to the filter gasket 181 so that the guide member 181a is inserted into the guide groove 152. The second fixing member 151a connects and fixes the end portions of the first, dust removing member 160 and the second dust removing member 170, which are positioned adjacent to the driving unit 110 inside the filter gasket 181. In this case, the second fixing member 151a may be fixed so that the first dust removing member 160 and the second removing member 170 can move penetrating the second fixing member 151a.

The end portions of the first dust removing member 160 and the second dust removing member 170, which are adjacent to the driving unit 110, are reciprocatingly exposed to the outside of the filter gasket 181 in which the driving unit 110 is positioned through the dust removing member moving hole 181b.

The connection member L connects and fixes adjacent end portions of the first dust removing member 160 and the second dust removing member 170 that are exposed to the side of the driving unit 110, and is rotatably coupled to one end portion of the second cam shaft 116 to connect the dust removing unit 150 to the driving unit 110.

The filtered dust collecting space 120a is formed on a bottom surface of the discharge unit discharge hole 140a so that the lower portion thereof communicates with the intake passage 101b. On the lower portion of the filtered dust collecting space 120a, a sealing member 300 for opening or closing a passage between the filtered dust collecting space 120a and the intake passage 101b is rotatably installed. When the vacuum cleaner 1 is operated, the sealing member 300 closes the passage between the filtered dust collecting space 120a and the intake passage 101b by means of a negative pressure, and when the vacuum cleaner 1 is not operated, the sealing member 300 opens the passage between the filtered dust collecting space and the intake passage 101b by dead-weight.

The upper portion of the filtered dust collecting space 120a having the above-described structure communicates with a lower space of the filter unit 180 of the discharge unit 140 to collect the dust dropped from the filter member 182.

FIG. 2 shows that the centrifugal separator 130 includes a lying type of centrifugal separating tube 131, a discharge tube 107, and a stabilizer 105. However, diverse modifications such as a standing type dual chamber and the like can be made without limit.

The centrifugal separator 130 having the above-described construction is coupled to an upper portion of the dust container 101 as a bottom surface of the centrifugal separator 130, on which a dust discharge hole 131c is formed, closes the upper intake hole of the dust container 101 to form the dust collector 100. The dust collector 100 coupled as described above is mounted on the main body 200 of a vacuum cleaner 1, and then is fixed by the main body cover 210.

Figure 3:
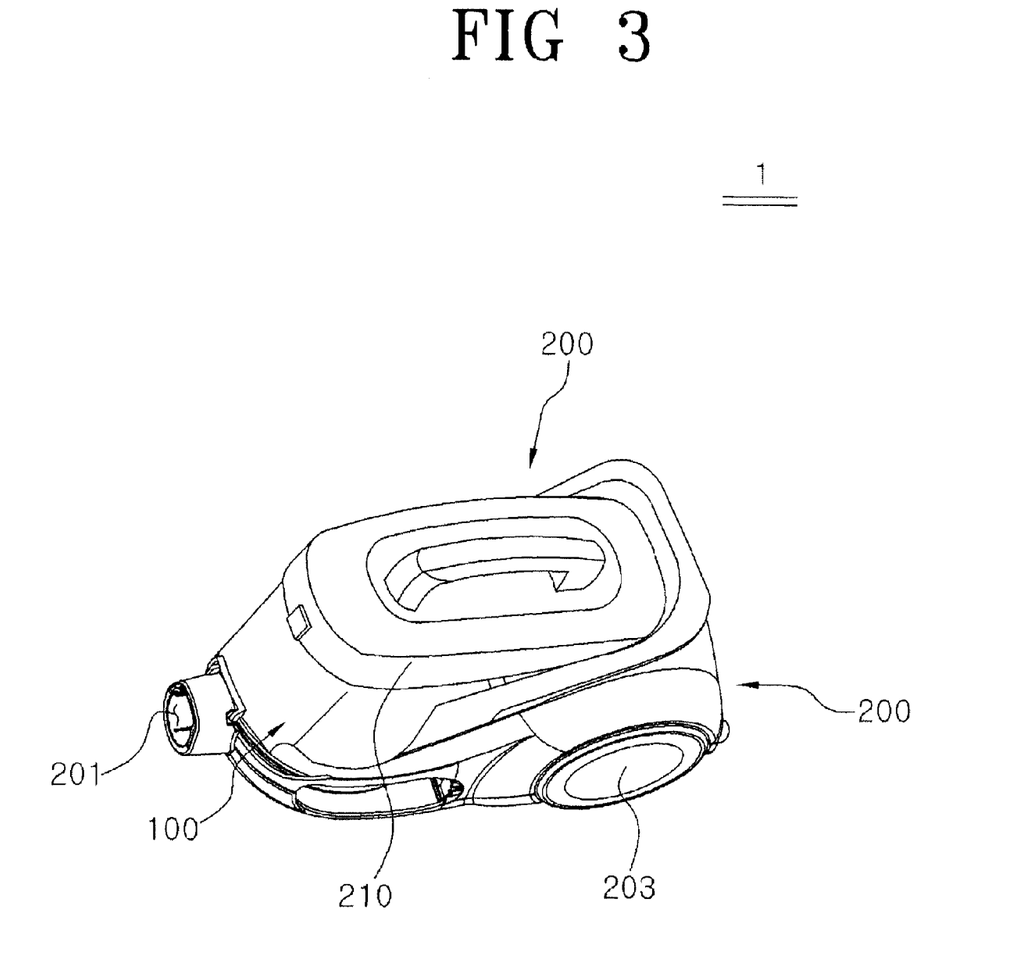
FIG. 3 is a perspective view of a vacuum cleaner 1 on which the dust collector 100 of FIG. 1 is mounted.

FIG. 3 is a perspective view of a vacuum cleaner 1 on which the dust collector 100 of FIG. 1 is mounted.

The main body 200 of the vacuum cleaner 1 includes a hose coupling hole 201, a main body cover 210 fixing the dust collector 100, and wheels 203 for movement of the vacuum cleaner 1.

The hose coupling hole 201 is formed on the lower portion of the main body 200, and a hose of a nozzle (not illustrated) is coupled to the hose coupling hole 201. The end portion of one side of the main body cover 210 is coupled to the main body 200 to be opened or closed by means of a hinge.

The main body 200 includes a fan motor unit (not illustrated) that generates an intake force of the vacuum cleaner 1. Since this is known in the related art, detailed description and illustration thereof will be omitted.

The dust collector 100 having the construction in FIG. 1 and FIG. 2 is mounted on the vacuum cleaner 1 and then is fixed by the main body cover 210 so that the discharge unit discharge hole 140a communicates with the inlet port (not illustrated) of the fan motor unit as illustrated in FIG. 3.

As described above, when the vacuum cleaner 1 is operated, the dust collector 100 fixed as described above separates dust from air that flows in by the intake force that is generated by the fan motor unit (not illustrated), collects the dust in the dust collecting space 120, and discharges air from which the dust has been separated through the discharge unit discharge hole 140a.

In this process, the filter member 182 filters fine dust included in the air from which the dust has been separated. The dust removing device 100a prevents the filter member 182 from being clogged even if the vacuum cleaner 1 is continuously used by removing the dust accumulated in the filter member 182. The sealing member 300 opens the lower portion of the filtered dust collecting space 120a through rotation by means of a weight thereof when the vacuum cleaner 1 is in a stopped state, and discharges the dust collected in the filtered dust collecting space 120a to the intake passage 101b. When the vacuum cleaner 1 is operated, the sealing member 300 is rotated by means of negative pressure and closes the lower portion of the filtered dust collecting space 120a.

Hereinafter, with reference to FIGS. 1 and 2, the operations of the dust removing device 100a, the dust collector 100, and a vacuum cleaner 1 will be explained.

The dust removing device 100a may be configured to operate in a standby time before the power is supplied after connecting the power code (not illustrated) of the vacuum cleaner 1 to an external power supply terminal (not illustrated) and in a standby time after the power is cut off before the power code is separated from the external power supply terminal.

Further, the dust removing device 100a may be configured so that a user can optionally operate the dust removing device 100a through a switch (not illustrated) provided on the vacuum cleaner 1.

If the dust removing device 100a is driven by the above-described configuration, the cam 113 is rotated as the motor shaft 112 is rotated. If the cam 113 is rotated, the first cam shaft 114 that is eccentrically coupled to the cam 113 is rotated to draw a circle having a radius that is equal to the eccentric distance from the center of the cam 113. If the first cam shaft 114 is rotated having the coupling radius, the cam shaft link 115 performs a reciprocating motion. Accordingly, by the second cam shaft 116 that connects the cam shaft link 115 to the connection member L, the dust removing unit 150 performs left and right reciprocating motion within a range of a distance that corresponds to the rotating radius of the first cam shaft 114 in the filter gasket 181.

As the dust removing unit 150 performs the left and right reciprocating motion, dust removing protrusions P formed on the lower portions of the first dust removing member 160 and the second dust removing member 170 collide with the upper surface of the filter member 182 to flick the dust (filter dust) accumulated in the filter member 160. In this case, since the dust removing protrusions P are formed to project from the entire area of the lower portions of the first dust removing member 160 and the second dust removing member 170, they may be in contact with the entire area of the filter member 182. Accordingly, the impact force through the dust removing protrusions P is transferred to the entire area of the filter member 182, and since the transferred impact force becomes larger in proportion to the contact area, the dust accumulated in the filter member 182 can be efficiently removed.

The filtered dust that is separated from the filter member 182 is collected in the filtered dust collecting space 120a.

If the operation of the vacuum cleaner 1 is stopped, the sealing member 300 is rotated around the hinge shaft 301 due to the weight of the dust collected in the filtered dust collecting space and deadweight, the lower portion of the filtered dust collecting space 120a is opened to communicate with the intake passage 101b, and thus the dust is discharged to the intake passage 101b.

The movement of the separated dust onto the filtered dust collecting space 120a and the intake passage is performed by means of the weight of the separated dust.

Further, a sealing member opening/closing the passage between the filtered dust collecting space and the intake passage by means of an intake force may be further included.

If the vacuum cleaner 1 is re-operated thereafter, the sealing member 300 is rotated by means of negative pressure to close the passage between the filtered dust collecting space 120a and the intake passage 101b. The dust separated from the filter and discharged to the inside of the intake passage 101b flows into the inside of the centrifugal separating tube 131 through the intake passage 101b, and then is collected in the dust collecting space 120 of the dust container 101.

Figure 4:
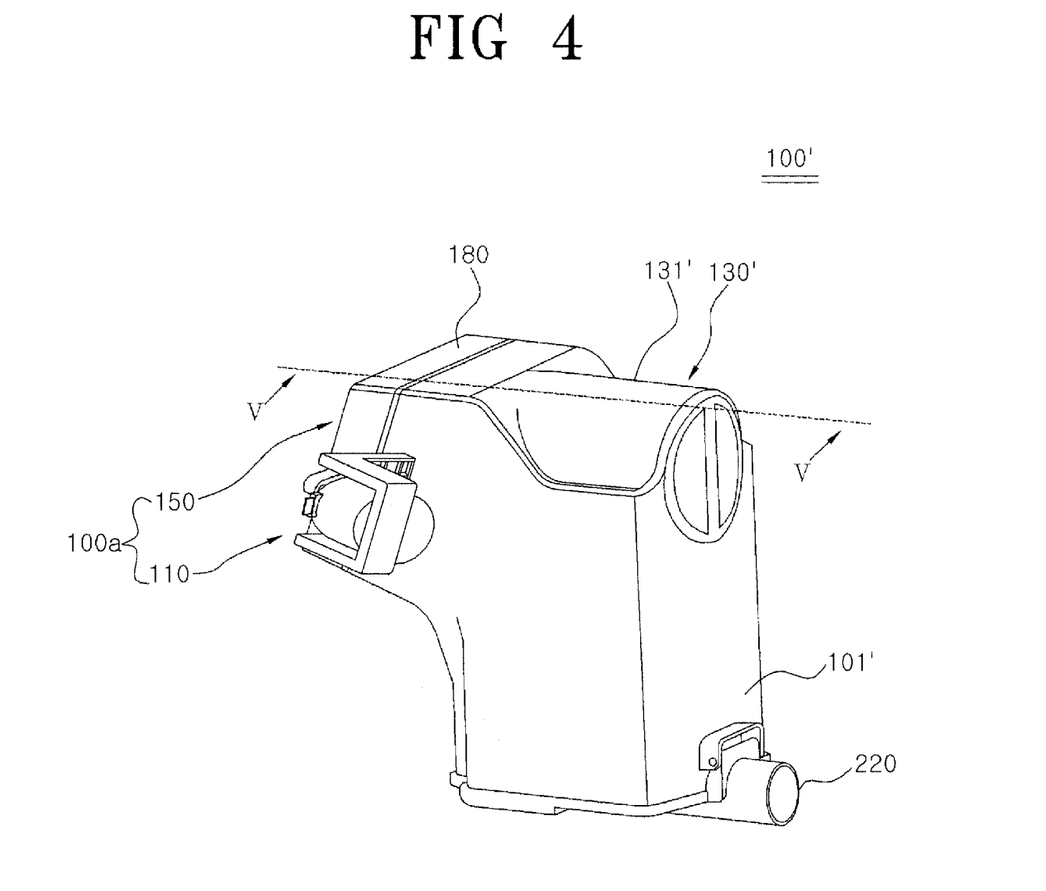
FIG. 4 is a perspective view of a dust collector 100' according to a second embodiment of the present disclosure.
Figure 5:
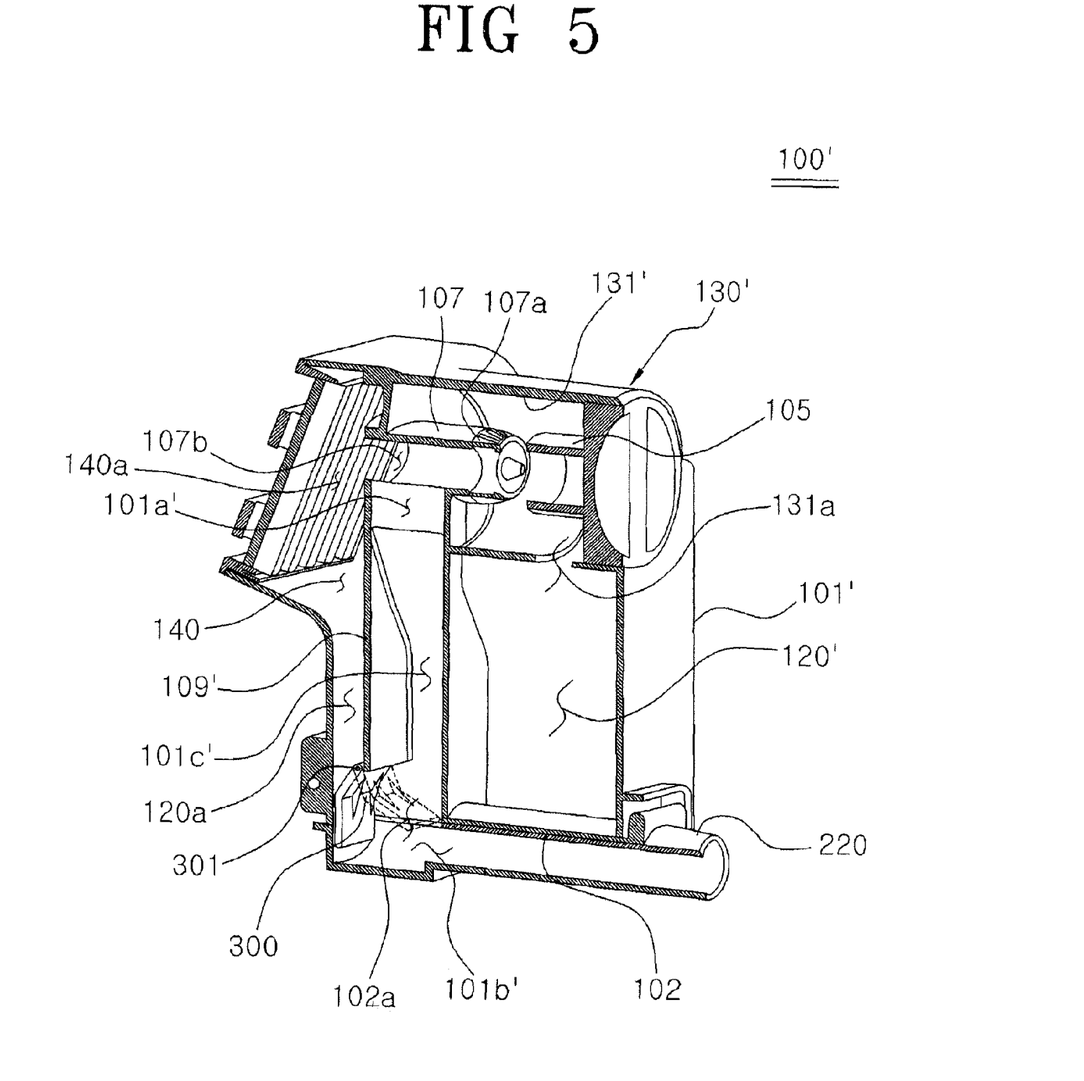
FIG. 5 is a cross-sectional view of a dust collector 100' by cutting along a vertical plane that passes line V-V of FIG. 4.

FIG. 4 is a perspective view of a dust collector 100' according to a second embodiment of the present disclosure, and FIG. 5 is a cross-sectional view of a dust collector 100' by cutting along a vertical plane that passes line V-V of FIG. 4.

The dust collector 100' illustrated in FIGS. 4 and 5 is different from the dust collector 100 illustrated in FIGS. 1 and 2 on the point that the dust container 101' and the centrifugal separator 130' are integrally formed. Specifically, as illustrated in FIGS. 4 and 5, the dust collector 100' includes the centrifugal separator 130' and the dust container 101'.

The dust container 101' includes a discharge unit 140, a filtered dust collecting space 120a, a dust collecting space 120', a vertical intake passage 101c', and a dust container cover 102. The dust container 101' may further include a horizontal intake passage 101b'. Here, the horizontal intake passage 101b' may be provided in the main body 200 or may be formed integrally with the dust container cover 102. In the case where the horizontal intake passage 101b' is integrally formed with the dust container cover 102, the horizontal intake passage 101b' and the vertical intake passage 101c' constitute the intake passage according to the present disclosure. Unlike this, in the case where the horizontal intake passage 101b' is formed in the main body 200 separately from the dust container cover 102, the vertical intake passage 101c' becomes the intake passage according to the present disclosure. In this case, as illustrated in FIG. 5, the horizontal intake passage 101b' is formed by an intake tube 220.

On one side portion of an upper portion of the dust container 101', a discharge unit discharge hole 140a is formed at a predetermined angle. On the discharge unit discharge hole 140a, as illustrated in FIG. 4, a dust removing device 100a that includes a filter unit 180, a dust removing unit 150, and a driving unit 110 is installed.

Since the configuration of the filter unit 180 and the dust removing device 100a is the same as that illustrated in FIGS. 1 and 2, the detailed description thereof will be omitted.

Referring to FIG. 5, a centrifugal separator 130' includes a centrifugal separating tube 131', a stabilizer 105, and a discharge tube 107. The discharge tube 107 is coupled to the inside of the centrifugal separating tube 131' so that the discharge tube discharge hole 107b and the discharge unit discharge hole 140a face each other. The stabilizer 105 is formed inside the centrifugal separating tube 131' so that an end portion thereof face an end portion of the discharge tube 107 on which a grille 107a is formed. The centrifugal separator 130' having the above-described configuration is installed inside the dust container 101' so that the discharge tube discharge hole 107b is apart for a predetermined distance from the discharge unit discharge hole 140a.

On the bottom surface on the side of the discharge tube discharge hole 107b of the centrifugal separator 130', a second separating wall 109' that extends to the bottom surface of the dust container 101' divides the dust container into left and right spaces. The left upper space of the centrifugal separator 130' that is divided by the second separating wall 109' becomes the discharge unit 140, and the left lower space becomes the filtered dust collecting space 120a. The lower space of the centrifugal separator 130' that is divided by the second separating wall 109' becomes the dust collecting space 120' that is partitioned by the second separating wall 109' and the bottom surface of the centrifugal separator 130'.

In a space that is adjacent to the discharge tube discharge hole 107b inside the dust collecting space 120', the vertical intake passage 101c' of which upper and lower end portions are open is formed in the vertical direction. The upper opening portion of the vertical intake passage 101c' is coupled to the centrifugal separating tube 131' to make external air flow into the discharge tube 107. The lower opening portion of the vertical intake passage 101c' is configured to communicate with the lower portion of the filtered dust collecting space 120a and the inlet port 102a of the dust container cover 102.

On the lower portion of the filtered dust collecting space 120a, the sealing member 300 one end portion of which is rotatably coupled thereto by the hinge shaft 301 is configured. When the vacuum cleaner 1 is stopped, the sealing member 300 is rotated by means of the weight thereof to open the lower portion of the filtered dust collecting space 120a. When the vacuum cleaner 1 is operated, the sealing member 300 closes the lower portion of the filtered dust collecting space 120a by means of negative pressure, and the filtered dust collecting space 120a is separated from the vertical intake passage 101c' and the horizontal intake passage 101b'.

The dust container cover 102 is installed to be able to open and close in a lower part of the dust container 101' so as to open or close the lower part of the dust container 101' including the inlet port 102a communicating with the vertical intake passage 101c'.

The dust container cover 102, as shown in FIGS. 4 and 5, is formed to have a curved surface which is in close contact with the horizontal intake passage 101b' that is formed in the main body 200. The horizontal intake passage 101b' has an open surface on the side of the inlet port 102a of the dust container Over, and communicates with makes the lower portion of the filtered dust collecting space 120a and the lower portion of the vertical intake passage 101c'.

The horizontal intake passage 101b' having the above-described structure may be formed integrally with the dust container cover 102.

Further, the dust collector 100' having the above-described structure according to the second embodiment is coupled to the main body 200 of the vacuum cleaner 1 as illustrated in FIG. 3, and performs dust separation and collection, dust removal of the filter member 182, and dust removal of the filtered dust collecting space 120a.

Referring to FIGS. 4 and 5, in more detail, if the vacuum cleaner 1 is operated, external air flows into the centrifugal separator 130' through the horizontal intake passage 101b' and the vertical intake passage 101c'.

The air flowing into the centrifugal separator 130' is rotated therein and the dust is separated. The dust separated from the rotating air is discharged to the dust collecting space 120' through the dust discharge hole 131 a, and air from which the dust has been separated is discharged to the discharge unit 140 through the discharge tube 107, and then is discharge to the outside of the dust collector 100'. In this process, fine dust that is included in the discharged air is filtered by the filter member 182.

In the process of performing the above-described operation, the driving unit 110 is operated by a preset driving method or through the user's operation, and the first and second dust removing members 160 and 170 that are in contact with the filter member 182 perform left and right reciprocating motion to flick the dust accumulated in the filter member 182. The preset driving method among the driving methods of the dust removing device 100a may be set to perform for a predetermined time after a power code of the vacuum cleaner 1 is connected to the external power supply terminal or to perform for a predetermined time before the power code is separated from the external power supply terminal after the operation of the vacuum cleaner 1 is stopped.

The filtered dust that is separated from the filter member 182 through the driving of the dust removing device 100a is collected in the filtered dust collecting space 120a. In this case, if the vacuum cleaner 1 is operated, the dust is collected on the upper portion of the sealing member 300 that closes the lower portion of the filtered dust collecting space 120a. Thereafter, if the vacuum cleaner 1 is stopped, the sealing member 300 is rotated around the hinge shaft 301 by means of the weight thereof to open the lower portion of the filtered dust collecting space 120a. If the sealing member 300 is opened, the dust separated from the filter member 182 is discharged to the lower portion of the vertical intake passage 101c' of the horizontal intake passage 101b'.

Thereafter, if the vacuum cleaner 1 is re-operated, the sealing member 300 closes the lower portion of the filtered dust collecting space 120a by means of negative pressure, and the filtered dust collecting space 120a and the horizontal and vertical intake passages 101b' and 101c' are isolated from each other to prevent the pressure loss and to prevent air flowing from the outside from directly flowing into the discharge unit 140.

In the embodiment of the present disclosure as described above, it is exemplified that the dust collector 100 or 100' is configured as a horizontal (lying) centrifugal separator 130 or 130' that is provided with the stabilizer 105 and the discharge tube 107 which are horizontally formed. However, a vertical centrifugal separator 130 or 130' may also be configured as described above.

Further, a plurality of centrifugal separators 130 and 130' may be formed.

Further, the centrifugal separator 130 or 130' may include a main centrifugal separator that separates big heavy dust and a plurality of auxiliary centrifugal separators (not illustrated) that remove fine dust included in the dust-separated air.

In the embodiments of the present disclosure as described above, a canister vacuum cleaner is exemplified. However, the present disclosure can be diversely applied to all vacuum cleaners, such as standing vacuum cleaner, a backpack vacuum cleaner, a hand-held type vacuum cleaner, and the like.

The dust compression type dust collecting device according to the present disclosure can be applied not only to all vacuum cleaners having a centrifugal separation type structure, such as canister or upright vacuum cleaner, but also to other dust collecting devices.

While the disclosure has been shown and described with reference to certain embodiments thereof, it will be understood by those skilled in the art that various changes in form and detail may be made therein without departing from the spirit and scope of the present invention, as defined by the appended claims.

The invention claimed is:

1. A dust collector for a vacuum cleaner comprising:
   a centrifugal separator;
   a discharge unit that is a filtered dust collecting space having a discharge unit discharge hole on a discharge side of the centrifugal separator, the lower portion of the discharge unit discharge hole communicating with an intake passage;
   a filter unit having a filter member and mounted on the discharge unit discharge hole;
   a dust removing device mounted on the filter unit;
   a dust container formed on a bottom surface of the centrifugal separator; and
   a sealing member opening the filtered dust collecting space and the intake passage by means of a weight thereof and closing the filtered dust collecting space and the intake passage by means of a negative pressure.

2. The dust collector for a vacuum cleaner as claimed in claim 1, further comprising:
   a dust container cover having a dust container cover inlet port formed thereon and coupled to a lower portion of the dust container to be opened or closed;
   a horizontal intake passage provided in the lower portion of the dust container cover to communicate with the dust container cover inlet port; and
   a vertical intake passage making the horizontal intake passage and a centrifugal separating tube of the centrifugal separator communicate with each other,
   wherein a lower portion of the filtered dust collecting space communicates with the vertical intake passage and the horizontal intake passage in an engagement position of the vertical intake passage and the horizontal intake passage.

3. The dust collector for a vacuum cleaner as claimed in claim 2, wherein the filtered dust, which is separated from the filter member through driving of the dust removing device and is collected in the filtered dust collecting space, is discharged to the horizontal intake passage if the sealing member is opened.

4. The dust collector for a vacuum cleaner as claimed in claim 1, wherein the dust removing unit comprises:
   dust removing members;
   a first fixing member connecting and fixing end portions of the dust removing members that are positioned to be far apart from the driving unit; and
   a connection member connecting and fixing end portions of the dust removing members that are exposed to the outside of the filter unit.

5. The dust collector for a vacuum cleaner as claimed in claim 4, wherein a plurality of dust removing protrusions is formed on a bottom surface of the dust removing member at predetermined intervals.

6. The dust collector for a vacuum cleaner as claimed in claim 5, wherein the dust removing protrusions are formed to protrude from the entire area of the bottom surface of the dust removing member.

7. The dust collector for a vacuum cleaner as claimed in claim 1, wherein the driving unit comprises:
   a motor;
   a cam coupled to a motor shaft of the motor;
   a first cam shaft rotatably coupled to the cam so that one end portion thereof becomes eccentric;
   a cam link having one end portion that is rotatably coupled to the other end portion of the first cam shaft; and
   a second cam shaft having an end portion that is coupled rotatably to other ends of the cam link and the other ends that are coupled rotatably to the connection member which connects and fixes ends of the dust removing members that are exposed to the outside of the filter unit.

8. The dust collector for a vacuum cleaner as claimed in claim 1, wherein the discharge unit is formed to be inclined at a predetermined angle against a vertical line that passes the center of the centrifugal separator so that the discharge unit discharge hole is positioned on the upper portion of the filtered dust collecting space.

9. The dust collector for a vacuum cleaner as claimed in claim 1, wherein the centrifugal separator is cylindrical and is installed in a horizontal direction, and the intake passage is installed on a lower portion of the centrifugal separator in a horizontal direction.

10. A dust collector for a vacuum cleaner comprising:
    a centrifugal separator separating dust from external air that flows in through an intake passage;
    a dust container into which dirt or the dust separated by the centrifugal separator moves;
    a filter unit installed in a downstream of the centrifugal separator to filter fine dust of the air discharged from the centrifugal separator;
    a dust removing device flicking the dust put on the filter unit; and
    a filtered dust collecting space in which the dust that is separated by the dust removing device is stored,
    wherein the dust that is separated from the filter unit by the dust removing device moves to and is temporarily stored in the filtered dust collecting space when the vacuum cleaner is operated, moves onto the intake passage when the vacuum cleaner is stopped, and moves to and is centrifugally separated by the centrifugal separator when the vacuum cleaner is re-operated to be finally stored in the dust container.

11. The dust collector for a vacuum cleaner as claimed in claim 10, wherein movement of the separated dust onto the filtered dust collecting space and the intake passage is performed by a weight of the separated dust.

12. The dust collector for a vacuum cleaner as claimed in claim 10, further comprising a sealing member opening/closing a passage between the filtered dust collecting space and the intake passage by means of an intake force.

13. A vacuum cleaner comprising:
    a main body;
    an intake nozzle body;
    a hose connecting the intake nozzle body to the main body; and
    a dust collector having a dust removing device removing dust that is accumulated in a filter member coupled to a discharge unit discharge hole,
    wherein the dust collector includes;
    a centrifugal separator receiving an inflow of external air through an intake passage;
    a discharge unit that is a filtered dust collecting space having the discharge unit discharge hole provided on a discharge side of the centrifugal separator, the lower portion of the discharge unit discharge hole communicating with an intake passage on a bottom surface thereof;
    a filter unit having a filter member and mounted on the discharge unit discharge hole; a dust removing device mounted on the filter unit;
    a dust container formed on a bottom surface of the centrifugal separator; and
    a sealing member opening the filtered dust collecting space and the intake passage by means of a weight thereof and closing the filtered dust collecting space and the intake passage by means of a negative pressure.

14. The vacuum cleaner as claimed in claim 13, wherein the dust container comprises:
    a dust container cover having a dust container cover inlet port formed thereon and coupled to a lower portion of the dust container to be opened or closed;
    a horizontal intake passage provided in the lower portion of the dust container to communicate with the dust container cover inlet port; and
    a vertical intake passage making the horizontal intake passage and a centrifugal separating tube of the centrifugal separator communicate with each other,
    wherein a lower portion of the filtered dust collecting space communicates with the vertical intake passage and the horizontal intake passage in an engagement position of the vertical intake passage and the horizontal intake passage.

* * * * *

UNITED STATES PATENT AND TRADEMARK OFFICE
CERTIFICATE OF CORRECTION

| | | |
|---|---|---|
| PATENT NO. | : 8,661,611 B2 | Page 1 of 1 |
| APPLICATION NO. | : 13/386296 | |
| DATED | : March 4, 2014 | |
| INVENTOR(S) | : Oh | |

It is certified that error appears in the above-identified patent and that said Letters Patent is hereby corrected as shown below:

On the Title Page Item [57] (Abstract), Line 10, delete "wherein" and insert -- where --, therefor.

Signed and Sealed this
First Day of July, 2014

Michelle K. Lee
*Deputy Director of the United States Patent and Trademark Office*